United States Patent
Petkov et al.

(10) Patent No.: US 11,810,243 B2
(45) Date of Patent: Nov. 7, 2023

(54) METHOD OF RENDERING A VOLUME AND A SURFACE EMBEDDED IN THE VOLUME

(71) Applicant: Siemens Healthcare GmbH, Erlangen (DE)

(72) Inventors: Kaloian Petkov, Lawrenceville, NJ (US); Christoph Vetter, Hopewell, NJ (US); Rishabh Shah, Plainsboro, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 0 days.

(21) Appl. No.: 17/154,568

(22) Filed: Jan. 21, 2021

(65) Prior Publication Data
US 2021/0279942 A1 Sep. 9, 2021

(30) Foreign Application Priority Data
Mar. 9, 2020 (EP) .................................. 20161937

(51) Int. Cl.
*G06T 15/08* (2011.01)
*G06T 7/50* (2017.01)
(Continued)

(52) U.S. Cl.
CPC ............. *G06T 15/08* (2013.01); *G06T 7/50* (2017.01); *G06T 15/04* (2013.01); *G06T 15/06* (2013.01); *G06T 15/30* (2013.01); *G06T 15/80* (2013.01)

(58) Field of Classification Search
None
See application file for complete search history.

(56) References Cited

U.S. PATENT DOCUMENTS

2008/0284781 A1* 11/2008 Wenger .................. G06T 15/08
345/589
2013/0328874 A1 12/2013 Smith-casem
(Continued)

FOREIGN PATENT DOCUMENTS

EP 3462418 A1 4/2019
WO WO2017039664 A1 3/2017

OTHER PUBLICATIONS

Bhalerao, Abhir, et al. "Fast re-rendering of vol. and surface graphics by depth, color, and opacity buffering." Medical Image Analysis 4.3 (2000): 235-251. (Year: 2000).*
(Continued)

*Primary Examiner* — Nurun Flora

(57) ABSTRACT

Computer-implemented methods for rendering a volumetric dataset and a surface embedded in the volumetric dataset are described. One method includes performing a volume rendering process to generate a volume rendering of the volume. Based on the volume rendering process, depths of respective locations in the volume rendering are determined, and the depths stored in association with the respective locations. A surface rendering process generates a surface rendering of a surface using the depths and respective locations. The volume rendering and the surface rendering are combined into a combined rendering of the volume and surface. In another method, depths of the surface at respective locations with respect to the volume are determined and the depths are stored in association with the locations. A volume rendering process includes a shading process which uses the depths of the surface and the respective locations.

27 Claims, 7 Drawing Sheets

(51) Int. Cl.
*G06T 15/04* (2011.01)
*G06T 15/06* (2011.01)
*G06T 15/30* (2011.01)
*G06T 15/80* (2011.01)

(56) References Cited

U.S. PATENT DOCUMENTS

| | | | |
|---|---|---|---|
| 2018/0227568 A1* | 8/2018 | Vetter | G06T 15/205 |
| 2018/0330538 A1 | 11/2018 | Petkov | |
| 2019/0221027 A1 | 7/2019 | Petkov | |
| 2021/0113193 A1* | 4/2021 | Schmied | G06F 3/04845 |

OTHER PUBLICATIONS

Bavoil, Louis, and Kevin Myers. "Order independent transparency with dual depth peeling." NVIDIA OpenGL SDK 1 (2008): 1-12.
Kreeger, Kevin A., and Arie E. Kaufman. "Mixing translucent polygons with volumes." Proceedings Visualization'99 (Cat. No. 99CB37067). IEEE, 1999. pp. 1-9.
Kruger, Jens, and Rüdiger Westermann. "Acceleration techniques for GPU-based volume rendering." IEEE Visualization, 2003. VIS 2003.. IEEE, 2003. pp. 1-6.
Levoy, Marc. "A hybrid ray tracer for rendering polygon and volume data." IEEE Computer graphics and Applications 10.2 (1990): 33-40.
Schott, Mathias, et al. "Ambient occlusion effects for combined volumes and tubular geometry." IEEE transactions on visualization and computer graphics 19.6 (2012): 913-926.
Schott, Mathias, et al. "Combined surface and volumetric occlusion shading." 2012 IEEE Pacific Visualization Symposium. IEEE, 2012. pp. 169-176.
Chen W. et al: "A Hardware Assisted LDI Building Algorithm with Application to Hybrid Volume Rendering", CAD/GRAPHICS1 2001, Aug. 22-24, Kunming, Aug. 22, 2001, pp. 1-8.
Bhalerao A. et al.: "Fast re-rendering of vol. and surface graphics by depth, color, and opacity buffering", Medical Image Analysis, Oxford University Press, GB, vol. 4(3), Sep. 2000, pp. 235-251.
Kaufman A et al: "Intermixing Surface and Volume Rendering", NATO ASI Series, vol. 60, "3D Imaging in Medicine", Springer Verlag, Berlin, DE, Jun. 1990, pp. 217-227.
Chen Wei et al: "Real-time ray casting rendering of volume clipping in medical visualization", Journal of Computer Science and Technology, Beijing; Nov. 2003, pp. 804-814.
Extended European Search Report (EESR) dated Sep. 14, 2020 in corresponding European Patent Application No. 20161937.6.

* cited by examiner

METHOD OF RENDERING A VOLUME AND A SURFACE EMBEDDED IN THE VOLUME

RELATED APPLICATION

This application claims the benefit of EP 20161937.6, filed on Mar. 9, 2020, which is hereby incorporated by reference in its entirety.

TECHNICAL FIELD

The present embodiments relate to a computer-based method of rendering a volume and a surface embedded in the volume.

BACKGROUND

Computer-based visualizations of datasets representing a volume may be generated using techniques generally known as rendering. Rendering may, for example, be used to visualize the results of a medical imaging process, such as a CT scanning process or the like. In the field of medicine, rendering may allow for a radiologist, a surgeon, or a therapist to visualize and thereby understand and interpret data representing anatomy. Providing a visualization of such data may, for example, be used for diagnosis, teaching, patient communication, etc.

Visualization of volume data is also applied in numerous other technical fields, for example in geological, industrial quality assurance and scientific simulations.

When visualizing a volume, in some circumstances, an added surface may be visualized that is partially or fully embedded in a volumetric dataset. For example, a surface may be rendered representing a model of an object such as a medical tool or implant in the scan volume of a patient or a segmentation of an organ of the patient. In another example, one or more non-physical objects, such as landmarks or labels may be rendered in the volume. Similar circumstances may also arise in a variety of other fields dealing with three-dimensional (3D) data, including CAD, CFD, and manufacturing.

SUMMARY

According to a first aspect, there is provided a computer-implemented method for rendering a volumetric dataset and a surface embedded in the volumetric dataset, the method including: performing a volume rendering process to generate a volume rendering of a volumetric dataset; determining, based on the volume rendering process, depths of respective locations in the volume rendering and storing the depths in association with the respective locations; performing a surface rendering process to generate a surface rendering of a surface, the surface rendering process including using the depths and respective locations; and combining the volume rendering and the surface rendering into a combined rendering of the volume (200) and the surface (250).

The locations may correspond with pixel locations in the volume rendering. The surface rendering process may include, based on a comparison of a depth of a fragment of the surface with a depth stored in association with a location associated with the fragment of the surface, clipping the fragment of the surface from the surface rendering.

The surface rendering process may include, based on a comparison of a depth of a fragment of the surface with a depth stored in association with a location associated with the fragment of the surface, selecting a rendering style or parameter for use in rendering the fragment by the surface rendering process.

The volume rendering process may include a physically-based rendering process and the depths may be obtained by sampling paths traced during the physically-based rendering process.

The depths may be obtained by determining, for each pixel in the volume rendering, an average depth value from a plurality of paths sampled to render the pixel by the physically-based rendering process.

Determining the depths of the respective locations in the volume rendering may include using a ray casting process to obtain the depths.

Using the ray casting process to obtain the depths may include: casting a plurality of rays through the volumetric dataset, each ray being associated with a location of the respective locations; determining, along each of the rays, at least one depth value associated with a predetermined change in a value related to the volumetric dataset, and storing the at least one depth values in a data structure; selecting, according to predetermined criteria, a pre-determined number of the at least one depth values at each respective location to be used as initial values for the depths at each of the respective locations.

Determining the depths of each respective location may include modifying the initial values using data obtained from a physically-based rendering process.

Determining the depths may include determining, for at least some of the respective locations in the volume rendering, a plurality of depths per location and storing each of the plurality of depths in association with a location of the locations.

The method may include selecting, for a given fragment of the surface, a surface rendering style or parameter for use in the surface rendering process used to render the fragment based on a comparison of a depth of the fragment with a depth of the depths at a location in the volume rendering associated with the fragment.

The method may include selecting, for the fragment, the surface rendering style or parameter for use in the surface rendering process used to render the fragment based on whether the comparison of the depth of the fragment with the depth at the location in the volume rendering associated with the fragment indicates that the fragment is occluded by or is not occluded by an object in the volumetric dataset.

The method may include selecting, for a given fragment of the surface, a surface rendering style or parameter for use in the surface rendering process used to render the fragment based on whether a comparison of a depth associated with the fragment with a depth of the depths at a location associated with the fragment indicates that the fragment is in front of, inside, or behind an object in the volumetric dataset.

According to a second aspect, there is provided a computer-implemented method for rendering a volumetric dataset and a surface embedded in the volumetric dataset, the method including: determining depths of the surface at respective locations with respect to a viewing point to be used to render the volumetric dataset and storing the depths in association with the respective locations; performing a volume rendering process to render the volumetric dataset, the volume rendering process including applying a shading process using the depths of the surface and the respective locations.

The shading process may include a modification process to modify one or more optical properties of a first point in the volumetric dataset based on a comparison of a depth of the first point with a depth of the surface stored in association with a location associated with the first point.

The modification process may be based on one or more properties of a fragment of the surface having the depth stored in association with the location associated with the first point.

The one or more properties of the fragment of the surface may include a colour, an opacity, and/or a normal direction.

Modifying the one or more optical properties of the first point may include performing a blending process to obtain a modified colour for the first point based on a colour of the first point and a colour of the fragment of the surface.

Modifying the one or more optical properties of the first point may include determining one or more parameters of the blending process based on a property of the fragment of the surface. The property of the fragment of the surface may, for example, be a property indicating that the fragment of the surface is at an edge of the surface.

The one or more optical properties of the first point may include an opacity. Modifying the one or more optical properties of the first point may include modifying the opacity of the first point, for example lowering the opacity of the first point to implement a transparency effect.

The method according to the second aspect may include performing a surface rendering process to produce a surface rendering of the surface. The surface rendering process may include the determining of the depths of the surface.

The surface rendering process may include a rasterization-based process.

The determining the depths of the surface at the respective locations may include performing a depth peeling process.

The determining the depths of the surface at the respective locations may include generating a fragment linked list. Generating a fragment lined list may include generating a $k^+$-buffer.

The surface rendering process may include rasterizing the surface for deferred shading during the volume rendering process, and, for example, computing one or more G-buffers for one or more depth layers defined by the surface.

The volume rendering process may include a ray casting process or a path tracing process.

The shading process may include computing shading for points along each of one or more rays cast during the ray casting process or along each of one or more primary rays used during the path tracing process.

Determining the depths of the surface at the respective locations may include determining, for at least some of the respective locations, a plurality of depths per location and storing each of the plurality of depths in association with a location of the locations.

According to a third aspect, there is provided a set of machine-readable instructions which, when executed by a processor, cause a method according to the first aspect or the second aspect to be performed.

According to a fourth aspect, there is provided a non-transitory machine-readable medium including a set of machine-readable instructions according to the third aspect.

According to a fifth aspect, there is provided an apparatus including a processor and a storage or memory including a set of machine-readable instructions which when executed by the processor cause the processor to perform a method according to the first aspect or a method according to the second aspect.

Further features and advantages of the invention will become apparent from the following description of preferred embodiments of the invention, given by way of example only, which is made with reference to the accompanying drawings.

BRIEF DESCRIPTION OF THE DRAWINGS

The present invention will now be described, by way of example only, with reference to the following figures, in which.

DETAILED DESCRIPTION

Visualizations of volumetric datasets may be rendered with an added surface, for example in a medical visualization workflow. For example, during rendering an image of a volume representing a patient it may be desirable to visualize additional objects in a desired location with respect to the patient. For example, a medical tool may be visualized to simulate a surgical operation on the patient, or it may be desirable to visualise surfaces used to label parts of the anatomy of the patient. Such objects may be modelled by use of a surface which may be embedded in the volumetric dataset which represents the anatomy of the patient. By defining a position of a surface representing an object with respect to the volume, an image may be rendered that allows visualization of the object which may be located inside the volume or close to the volume.

One way of handling rendering of both volume and surface data is to use a rasterization technique to render the surface and to query a depth buffer obtained from the rasterization during computation of the volume rendering integral. For example, traversal of a ray during the computation of the rendering integral may be stopped at the depth specified by the surface rendering depth buffer. The resulting rendered volume may then be composited over the rendering of the surface produced by the rasterization technique. Such methods may require re-rendering of the volume each time a change, e.g., in position, is made to the surface. This can be computationally expensive, particularly where a physically-based rendering technique such as Monte Carlo path tracing is used to render the volume.

In certain known examples, the visualization of the surface may be obtrusive and may undesirably occlude portions of the volume. For example, where a part of the volumetric dataset represents a patient's liver, a segmentation surface of the liver may obscure internal vessels or lesions represented by the volumetric data. In some examples, the surface may be visualized as a semi-transparent solid surface. This allows internal structures to be visualized. However, the handling of multiple semi-transparent surfaces may require complex depth merging techniques, such as depth peeling and variants thereof.

Figure 1:
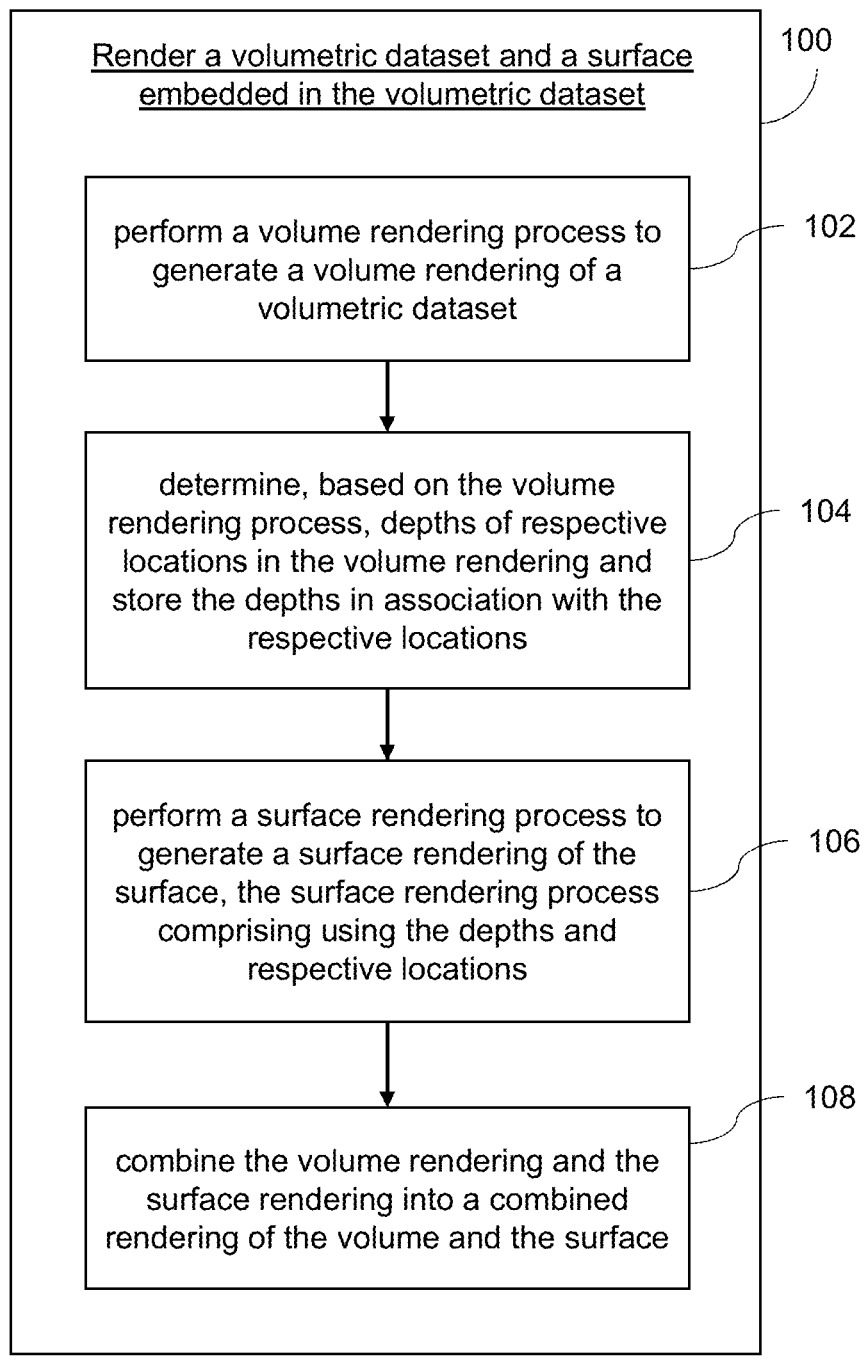
FIG. 1 illustrates a flow chart representation of a method of rendering a volumetric dataset and a surface embedded in the volumetric dataset according to certain examples described herein.

FIG. 1 illustrates a flow chart representation of an example method 100 of generating a computer-based representation of a volumetric dataset and a surface embedded in the volumetric dataset.

The method 100 includes, at block 102, performing a volume rendering process to generate a volume rendering of the volumetric dataset. The volumetric dataset may include a plurality of voxels. Various volume data reconstruction filters may be used during rendering, e.g., nearest neighbour, trilinear or higher-order filters such as the B-spline filter. The filter may be interpolating or not. Where the filter is not interpolating, over-smoothing may be used as part of the rendering.

In some examples, data filtering may be applied separately from the rendering process. The data filtering may include, e.g., gaussian smoothing, unsharp masking, thresholding and various morphological operations.

At block 104, the method includes determining, based on the volume rendering process, depths of respective locations in the volume rendering and storing the depths in association with the respective locations. The volume rendering process may, for example, include a physically-based rendering process, such as Monte Carlo path tracing. The depths may be obtained from tracing paths during the path tracing process. For example, depth data corresponding to stochastic light scattering events sampled during the path tracing process may be used to obtain depth data for locations associated with the scattering events.

Each of the respective locations may correspond with a pixel in the volume rendering. Determining the depths and respective locations may include determining what may be referred to herein as a "depth image". A depth image includes the per-pixel distance between the viewing camera and 3D structures in the volume data. The depth image may be considered conceptually similar to the output of a modern RGBD camera. Selecting the 3D structure in the volume data which provides the distance to be stored as the depth for a given pixel may include use of a heuristic. For example, using one particular heuristic may include determining the first time the optical opacity along a ray associated with a given pixel is above a certain threshold and labelling the voxel location, i.e., the 3D location in the volumetric dataset represented by the voxel, at which this occurs as 'solid' and using the voxel location for depth image generation.

In some examples, the depth for a given pixel may be obtained by determining an average depth value at which a plurality of paths traced for the given pixel are scattered. For example, a depth may be determined by determining an average or median depth value at which a plurality of paths traced for the given pixel are scattered. In other examples, a machine-learning-based heuristic may be applied to compute a depth value for a given pixel based on data gathered from a plurality of paths which are traced.

Additionally, or alternatively, the volume rendering process may include a direct volume rendering process such as ray casting. In some examples, determining the depths of the respective locations in the volume rendering includes using a ray casting volume rendering process to obtain one or more initial depth values for each respective location. The initial values may be modified or refined during volume rendering, for example, by use of depth data obtained during a path tracing process. This will be described below in more detail.

In some examples, a plurality of depths may be obtained for each pixel in the rendering or for at least some of the pixels in the rendering. Each of the plurality of depths may be stored in association with the respective pixel. Accordingly, a plurality of depth layers may be defined for the volume rendering, which may be referred to as depth images.

At block 106, the method includes performing a surface rendering process to generate a surface rendering of the surface. Generating the surface rendering includes using the depths and respective locations, e.g., depths corresponding with respective pixels in the image being rendered, obtained from the volume rendering process. For example, the surface rendering process may include rasterization. The surface may be a mesh or the like, as will be described below in more detail. The depths obtained from the volume rendering may be used to clip fragments of the surface during the surface rendering. For example, a fragment of the surface may be clipped from a rasterization, based on a comparison of a depth of the volume rendering at a location associated with the surface fragment. For example, a comparison of a depth associated with the surface fragment with the depth of the volume rendering at a respective location, e.g., pixel, associated with the fragment may indicate that the surface fragment is occluded by an object in the volume. In this case, the occluded fragment may be clipped from the rasterized image so that it is not visible in the final combined image. In another example, a rendering style or a parameter for use in the surface rendering may be selected for a given surface fragment based on whether the surface fragment is occluded or is not occluded by the volume data. Examples of this are described below in more detail.

In some examples, where a plurality of depths are determined for respective locations in the volume rendering, the surface rendering style or the parameters thereof applied to a given surface fragment may depend on a comparison of a depth associated with the fragment with one or more depths of the volume rendering at the respective location associated with the fragment. This may, for example where two depth images are used, allow a different rendering style to be applied to a surface fragment based on whether the comparison indicates that the surface fragment lies in front of, inside, or behind an object in the volume. The plurality of depths may, for example, include depths for different parts of the anatomy per pixel, e.g., a depth may correspond to a layer of skin or to bone and to an organ.

At block 108, the method includes combining the volume rendering and the surface rendering into a combined rendering of the volumetric dataset and the surface. For example, the volume rendering process may produce a path traced volume rendering and the surface rendering may produce a rasterized surface rendering. The rasterization may be overlaid onto the volume rendering. The resulting combined rendering may be transmitted to visualization apparatus, to be displayed to a user.

Example methods described with reference to FIG. 1 therefore provide for depth data related to the volumetric dataset to be extracted during the volume rendering process and used in rendering the surface to embed a rendering of the surface in a rendering of the volumetric dataset. The surface may be rendered using a rasterization process during which depth data from the volume renderer may be used to clip portions or fragments of the surface which fall behind the depths extracted from the volume rendering. The rendering of the surface produced from the rasterization process may be composited with the volume rendering, e.g., overlaid directly onto the volume rendering, to produce a combined rendering of the volume and the surface. This provides a fast approach for producing a rendering of the surface and the volume. Further, where a stochastic volume rendering process such as Monte Carlo path tracing is used, example methods described herein allow for the surface data to be updated without restarting rendering of the volume data.

Since in some examples described herein restarting of the volume rendering process when using path tracing is not necessitated by updating the surface data, certain example methods described herein may find application in, for example, live editing of landmarks and/or annotations embedded in the volume as well as, for example, changing the style of visualization used for the surface without re-rendering the volume. For example, the visualization of the, e.g., segmentation, surface may be changed between a visualization of the entire surface and a less intrusive, silhouette rendering of the surface. Further, obtaining depth data which relates a position of the surface to be rendered to 3D structures in the volume allows in some examples for different rendering effects to be applied based on whether the surface is occluded or is not occluded by the volume. Examples of this are described in more detail below.

The volume rendering process for rendering the volume and from which the depth image is obtained may be any suitable volume rendering technique such as path tracing or ray casting, or in some examples a combination of both path tracing and ray casting.

Figure 2:
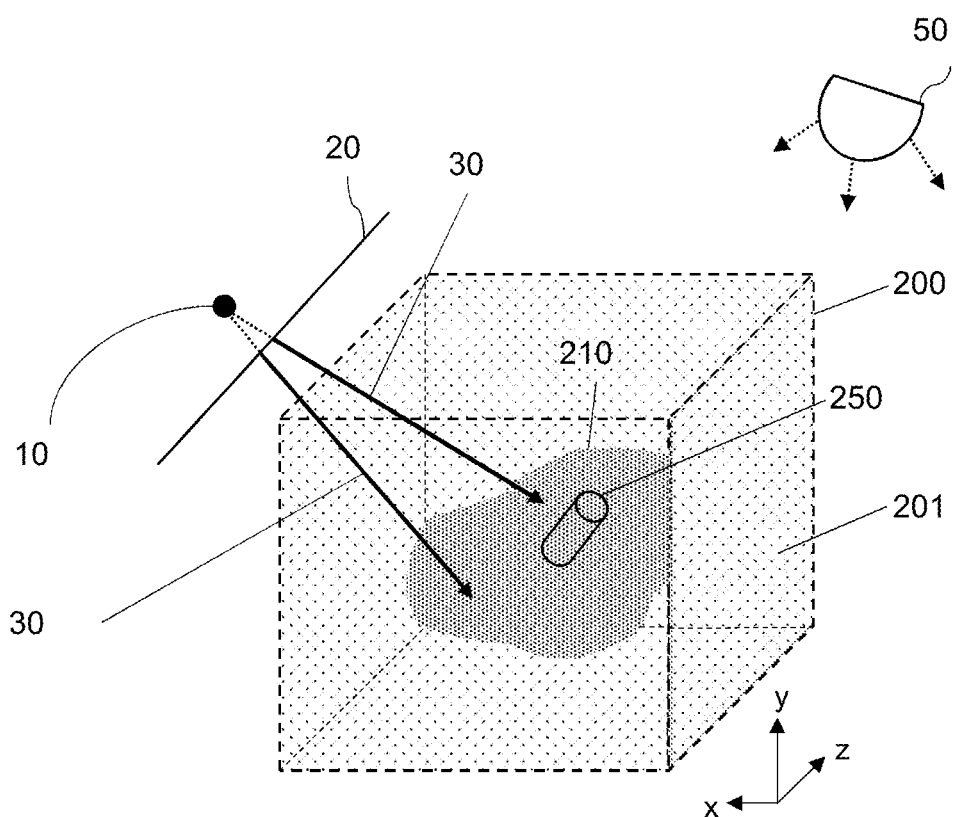
FIG. 2 illustrates schematically a volumetric dataset and a surface embedded in the volumetric dataset and an example method of rendering the volumetric dataset and the surface.

FIG. 2 illustrates schematically a volumetric dataset 200 and surface 250 to be rendered by example methods described herein. The volumetric dataset 200 may be referred to herein as the volume 200.

The volumetric dataset 200 may include a discrete sampling of a scalar field. For example, the volumetric dataset 200 may include a medical dataset. Such a medical dataset may be received by loading from a memory, sensors, and/or other sources. Such a medical dataset may represent a part of a patient, for example a human or animal patient. In general, any scanning modality which will produce a volumetric dataset may be used to produce the volumetric dataset 200. For example, the scanning modality may include the use of computed tomography (CT), or of magnetic resonance imaging (MRI). In some examples a scanning modality including the use of positron emission tomography (PET), single photon emission computed tomography (SPECT), ultrasound, or another scan modality may be used. Scan data may be provided in the form of multiple two-dimensional (2D) scans or may be formatted from a scan. In some examples, the volumetric dataset 200 is a DICOM dataset created by scanning at least a portion of a patient using a scanning modality. In other examples, values making up the volumetric dataset 200 may represent geological data (e.g., gathered using seismic data), or as part of industrial quality assurance (e.g., gathered using industrial x-ray scans). In other examples, the volumetric dataset 200 may include values representing an object produced via a scientific model rather than measured values representing a physical object. In other examples, a volumetric dataset may include data relating to a non-scalar field. For example, the volumetric dataset may include data relating to a velocity field produced by a fluid simulation.

In examples, the volumetric dataset 200 may include data formatted as a plurality of voxels 201. The voxels 201 may, for example, be in a uniform or non-uniform grid, or may be arranged in some other type of geometry (e.g., polar coordinate format). Each voxel 201 may represent a scalar value, such as scalar value obtained by sampling a scalar field, as described above. The type of scalar value represented by each voxel 201 may be dependent on the way with which the volumetric dataset 200 is obtained. For example, where a CT scanner is used to produce the volumetric dataset 200, the dataset may include Hounsfield values. In this example, the volumetric dataset 200 includes a representation of an object 210, which may be a representation of a portion of a medical patient or the like.

In examples, each voxel 201 in the volume 200 is classified and assigned visual parameter data. In one example, the visual parameter data assigned to each voxel 201 includes an opacity and a colour. In examples, the visual parameter data assigned to each voxel 201 is determined via use of a transfer function, as mentioned in examples above. A transfer function may assign visual parameter data to the voxel 201 based on, for example, the scalar value of the voxel 201. In some examples, additional properties related to the voxel 201, such as a gradient of the scalar values of the volumetric dataset 201 at the voxel, may be used an input into a transfer function and therefore may affect the visual parameter data assigned to the voxel 201.

In other examples, a transfer function may assign to a given point in the volume 200 one or more of: a scattering coefficient, a specular coefficient, a diffuse coefficient, a scattering distribution function, a bidirectional transmittance distribution function, a bidirectional reflectance distribution function, and colour information. These parameters may be used to derive a transparency, reflectivity, surface roughness, and/or other properties of the surface of the given point. These surface material properties may be derived based on scalar values of the volumetric dataset at the rendering location, and/or based on user-specified parameters.

Example methods of rendering the volumetric dataset 200 and the surface include defining a viewpoint 10 with respect to the volumetric dataset 200. A viewing plane 20 is also defined and located in front of the viewpoint 10. The viewing plane 20 includes a number of pixels (not shown in the figures), e.g., arranged in a grid, and allows construction of a visualization of the volumetric dataset 200, as viewed from the viewpoint 10. With the viewpoint 10 defined, a volume rendering method such as ray casting or a physically-based volume rendering method such as path tracing may be employed to render the volume 200. Some examples employ both ray casting and path tracing, as described below.

In some examples a sample point may not be coincident with a voxel 201 and, as such, interpolation may be employed to determine a scalar value at that sample point. For example, trilinear interpolation, or another example method of interpolation, may be performed to determine an interpolated scalar value for a sample point. The transfer function may then be applied to the interpolated value of the volumetric dataset 200 at the sample point. It will be appreciated that interpolation may be done before applying a transfer function or the like, or values resulting from application of such a function may themselves be interpolated for use in methods herein.

In examples, a rendering algorithm may model an illumination effect by modelling a light source 50 illuminating the volume 200. The illumination effect may be taken into account when accumulating the accumulated opacity and colour values along the ray 30. The light source 50 may be a point source, a directional light source, or may include a light map. The simulation light source may also be any other kind of light source—e.g., a model of any object which emits light—or a combination of multiple different light sources. In some examples, parts of the volumetric dataset itself may emit light. In some examples, the light source may include a high definition light map. The light map in some examples may have six sides corresponding to outer sides of the volumetric dataset where the volume is cuboidal, for example.

Ray casting includes traversing a number of simulated rays 30 through the volumetric dataset 200, wherein each of the rays 30 intersects the viewing plane 20 and the rays 30 are convergent at the viewpoint 10. For example, one ray, or more than one ray, may be traversed through the volume 200 for each pixel of the viewing plane 20. Each ray 30, which is traversed through the volume 200 may allow determination of a value or set of values for display by a pixel of viewing plane 20 which is intersected by that ray 30. For example, a rendering algorithm may be employed which determines a value for display by the pixel via a calculation taking into account the path of the ray through the volume 200. In some examples, a colour and brightness for the pixel may be determined via traversing a ray 30 through the volume 200 from the viewpoint 10 and calculating the effect on the ray 30 of accumulated visual parameters of parts of the volume 200 which lie along a path of the ray 30.

In ray casting, a plurality of sample points within the volumetric dataset 200 along the path of each ray 30 may be selected. Some of these may lie outside points in the object 210 and thus may not contribute to the colour and opacity value for display by the pixel with which the ray 30 is associated.

In Monte Carlo path tracing, light propagation through the volume 200 is simulated, including simulating scattering and absorption, by tracing a plurality, for example millions, of simulated light rays.

As mentioned above, FIG. 2 also shows the surface 250 embedded in the volume 200. In this example, the surface 250 represents an object, such as a medical implant or a segmentation surface of an organ. In examples, one or more surfaces may be provided embedded or partially embedded in the volume 200. Surfaces of any shape may be provided, such as a surface modelling an organ, tool, or other object. For example, a medical tool that may be inserted into a patient is modelled, such as transoesophageal (TEE) ultrasound probe. The surface may have a flat, curved, or both flat and curved portions. The surface may be open or closed. The surface may have any numbers of textures or surface properties (e.g., transparency, dullness, rough, flat, smooth, colour, shininess, or gloss). The material of the surface is defined by any number of surface properties, or the material definition (e.g., plastic) indicates the surface properties.

The surface may be a model representing an object not actually modelled by the volumetric data, but contained in the same patient space, e.g., a CAD model of an implant during an implant placement simulation. Alternatively, the surface may be a model representing an object in the patient volume. For example, the surface may be a segmentation of an organ. In yet other embodiments, the surface is detected from the voxel data and separately quantified or modelled (e.g., a segmented, implicit, or iso-surface). For example, an inserted tool (e.g., catheter, endoscope, stent, or valve) existing within the patient is detected and the surface of the tool identified by segmentation or other detection.

Any suitable surface model may be used to define the surface. In one approach, the surface is embedded in a structured 3D grid and each voxel corresponding to the surface is flagged or used to define the surface. In another approach, the connected nodes of an unstructured grid define the surface. The nodes may be at or may be separate from the voxel locations. The surface definition may have the same or a different resolution as the volume or voxel data. Voxels may be tagged as "inside" or "outside" in order to represent a closed surface. Alternatively, a distance field may be used, where each voxel stores a distance to the surface. The surface is then the iso-surface having a distance to the surface of 0.

The location of the surface relative to the scanned volume is known or set. Where modelling is used, the location of the surface relative to the volume may be arbitrary or based on detected anatomical structure. Where segmentation of implicit structure is used to find the surface from the voxel data, the location relative to the volume is also determined. The location of the surface relative to the volume may be static or may change over time.

Due to the variety of medical applications, more than one surface may be of interest. There may be multiple surfaces, such as for different organs, different parts of an organ, different tools, different parts of a tool, or combinations thereof. The surfaces may be independent of each other, for example having no common or intersecting locations. Alternatively, the surfaces may contact or intersect, but be separately defined. There may be one, two, three, or more surfaces for a given scan volume.

In some examples, for example where the surface rendering process includes ray tracing or path tracing, an acceleration structure may be used to efficiently compute the ray-surface intersection results for use in the surface rendering process. Any suitable acceleration structure for computing ray intersections with the surface/s in a real-time or interactive environment may be used.

In examples herein, as mentioned above, volume rendering techniques, such as a physically-based rendering process, e.g., Monte Carlo path tracing, may be used to obtain depth values to generate one or more depth images of the volume 200, during volume rendering of the volume 200.

For example, during a physically-based rendering process, a combination of depths corresponding to various scattering points obtained during the physically-based rendering may be used to obtain depths for different positions in the volume rendering.

In some examples, for each pixel in the volume rendering, a depth is determined from the Monte Carlo path tracing. For example, a random number generator determines an opacity up to which a ray is to be traced through the volume. Depending on the gradient magnitude at a given location in the volume along the ray, the ray may be scattered by the given location in the volume. The scatter points indicate where the depth may be sampled. Due to the random sampling in physically-based volume rendering, different potential depths are considered. The scattering occurs at different depths due to the stochastic nature of the rendering. The chance of scattering during the ray traversal is a consequence of the Monte Carlo integration with randomized sampling of the light paths. Intuitively, denser volume regions can be expected to act more like local surfaces, therefore there is a higher chance of scattering. During the Monte Carlo integration with randomized sampling, a voxel intensity threshold may be selected at random. The opacity accumulated along a ray traversing a denser region of the volume 200 may then reach the selected threshold more quickly than a ray traversing a sparser region of the volume 200.

A bidirectional reflectance distribution function (BRDF) is provided for each voxel. The BRDF controls the scattering parameters, including the intensity of any scattered (reflected) light. The BRDF determines how much of the light takes a path of no scatter. For example, a shiny surface may reflect most light towards an outgoing light direction (e.g., towards an observer) while a diffuse surface may reflect light in a variety of random directions. The BRDF models this scattering behaviour.

A location at which the ray is scattered may be indicative that a surface exists in the volume at that location. Such a surface, in some examples, may be referred to as a local implicit surface in the context of shading computations. For example, the voxels associated with a local implicit surface may locally behave as a surface for lighting computations, e.g., due to the gradient of the volume or the classification of the voxels. For example, a surface in the volume may be a boundary between two types of material in the volume data and, it should be noted, is not a surface as used elsewhere herein to describe additional, non-volumetric, elements embedded in the volume data. Thus, scattering locations can be used to obtain depth values for the volume, where a depth value represents a distance along the ray until a surface is reached. Since Monte Carlo path tracing involves random sampling of a plurality of rays, a plurality of different scattering samples may be obtained, each occurring at the same or different depths due to the stochastic nature of the rendering. A given pixel in Direct Volume Rendering (DVR) contains the projection of points along a viewing ray through the volume. In path tracing, the same volume integral is computed as the integration of the light paths. Therefore, a plurality of scattering events is computed for each pixel and these can be used to obtain one or more depth values for the pixel.

To determine depths for the pixels based on path tracing, one or more heuristic algorithms compute representative depths along the viewing rays using the scattering samples obtained for a given pixel. A depth is obtained for each pixel with a given camera position. In some examples, more than one depth value is obtained for at least some of the pixels in the volume rendering.

In one example, the depth for a given pixel is an average depth calculated from the scattering sample rays for that pixel. For example, a running average of the depth for the rays at a pixel may be determined. The average depth may be used as a depth in the depth image as it is likely to converge to a surface in the volume, i.e., a boundary between two different materials in the volume rather than a surface as used elsewhere herein to describe elements which are additional to the volume data. As discussed above, some examples may include determining a median depth value. Other examples may instead compute a depth from a plurality of samples using, e.g., machine learning-based heuristics.

In some examples, a weighted average may be used to determine the depths. Weights applied to the averaging of the depth values obtained from each scattering sample may be based on the optical properties, such as optical colour and optical opacity, for the voxel. The colour or intensity at any scatter depth included in the average thus weights the contribution of each sample to the weighted average. The optical properties are typically computed from the classification of the volumetric dataset (e.g., derived from applying a transfer function to the voxel values of the volumetric dataset), so may be easily used to calculate depth. Any mapping of optical properties to weight may be used, such as mapping higher scalar values or brighter colour to greater weight and lower scalar values or less intense colour to lesser weight. Likelihood of scattering at a given voxel may be used as a weighting factor instead of optical properties of the voxel. For example, a greater likelihood of scattering may weight a sample more heavily than lesser likelihood of scattering. The determined likelihood of scattering may be based on the optical properties for the voxel. In other embodiments, other thresholding and/or derived values may be used for weighting and/or averaging.

In another example, the depths to populate the depth image may be obtained through a clustering technique. Scattering locations computed for light paths through each pixel during the path tracing may be grouped together into clusters and a depth associated with a particular one of the clusters may be assigned to the pixel. In one example, the depth associated with a particular cluster may be determined by computing a location in 3D space of a cluster center of the cluster. The distance from the cluster center to the viewing camera may then be computed as the depth of the cluster. In other examples the depth associated with a cluster may be computed using the average or median, of the positions of the points in the cluster. In yet another example, a machine-learning based technique may be used to compute the depth of the cluster. Different heuristics may be used to select a cluster to provide a depth for a given pixel. For example, the closest cluster to the viewing camera or the cluster with the largest scatter point density may be selected.

Any suitable means of clustering the samples for each pixel may be used. For example, k-means clustering of the sample points along the viewing rays may be used. Then, by finding a cluster of scattering samples or grouping of similar probabilities of scattering along the ray, a surface may be identified, and a depth value accordingly assigned to the pixel.

In another example, a method of clustering may use a histogram of scatter point distances having a scatter point density meeting a pre-determined threshold. The histogram, populated with the samples, includes a plurality of bins corresponding to different ranges of depth values. A number M of rays are sampled, and the depth values obtained from these passes are used to populate the histogram. The bin of the histogram populated with the greatest number of scatter samples after the M rays are sampled is determined and used to determine the depth used to provide the depth value for the depth image. Alternatively, the bin with a sufficiently high scatter probability and sufficiently high number of samples may be selected to be used to provide the depth value. The scatter probability of a given bin may be derived or computed from the voxel gradient or another data property. In examples, selecting a bin with a sufficiently high number of samples to provide the depth value may mean that a given high gradient part of the volume with high scatter probability may not be selected if the histogram does not contain a high enough number of samples for rays hitting that given part of the volume. For example, the given part of the volume may be occluded by another area with a high scatter probability. A suitable heuristic may be used to provide the depth value from the samples in the bin. For example, an average or median of the depths of the samples in the bin may provide the depth value. In another example, the centre point of the bin may provide the depth value. Other examples may use different heuristics to obtain the depth value, such as machine-learning based heuristics.

In another example, multiple depth histograms may be used. For example, once a bin has been selected from the first histogram (as described above), the range of depths for that bin is then redistributed into a separate, second histogram. The range of depths contained in the bin of the first histogram is sub-divided to provide bins representing different sub-ranges of the bin of the first histogram. For example, the depth of the scene (or the object depicted in the scene for medical volume rendering) is binned into N bins (where, for example, N=16). After M rendering passes have been performed to path trace for the given pixel, the bin with most hits is subdivided into N bins again and the hits in other bins are discarded. This sub-division may proceed until convergence or for a given number of iterations. The depths in the bin of the final histogram with the highest number of hits may then be averaged to compute the depth at that pixel position. Other heuristics or combinations of heuristics may be used to determine depth for each ray.

In examples, more than one depth may be assigned for a given pixel of the volume rendering. For example, a process of clustering may indicate the presence of several surfaces through the volume for the given pixel. For example, path tracing for the pixel may indicate that along the viewing ray the volume includes an object including a back surface and a front surface, and possibly one or more interior surfaces. Where a given ray does not pass through a surface of the volume, no depth is assigned. Where a given ray passes through only one surface of the volume, only one depth is assigned. In an alternative, classification is used. That is, different objects represented by the 3D data are rendered separately, providing for different depths depending on the object being rendered. For example, different classifications for the voxels (e.g., through application of a transfer function or a look-up table) may be used to compute depth images for skin and bone, even if the main rendering uses a muscle rendering classification preset. In yet another alternative, rendering and depth assignment are provided in a sequence where outer layers of data are progressively removed.

As described above, in examples, the volume may include several layers. Therefore, the depth image may also include several layers. That is, pixels in the volume rendering may have associated with them more than one depth value. The depth values allow added surfaces embedded in the volume to be visualized in accordance with the layer in the depth image in which they are located. For example, if an added surface lies before a position indicated by a first depth image, i.e., in a layer of the volume closest to the viewing point, the surface may be considered to be in front of the object represented by the volume, i.e., not occluded by the volume, and may be rendered in a manner selected accordingly. If the surface lies behind the first depth, the surface may be considered to be behind one or more 3D structures contained in the classified volume data, i.e., occluded by the volume, as viewed from the viewing point, and may be rendered in a different manner. This allows a viewer to easily discern where an added surface lies in relation to the object represented by the volume. The accuracy of the embedding may depend on the number of depth images used during the rendering. For example, using more than one depth image allows for more information to be imparted to a user relating the position of the surface to the depths contained in the various depth images. For example, if a surface fragment is occluded by the volume, as indicated by the depth image, the surface fragment may be clipped during rasterization of the surface, such that it does not contribute to the rasterized image. Further examples of ways in which non-volumetric surfaces may be rendered based on the depth image will be described below.

In some examples, initial values may be determined for the depth values of the depth image and these initial values may subsequently be refined as rendering of the volume progresses. In one example, ray casting is used to initialize depth values in the depth image. The depth values may then be refined progressively, during path tracing, as described above.

In such an example, possible clusters of depth values representative of surfaces in the volume are first established by ray casting. For a given pixel, positions are picked along the ray used during ray casting where the material of the volume changes in a certain way, e.g., where there is a rapid change in opacity or a colour transition. These positions may be stored in a data structure. In order to increase the precision with which these positions are determined, a binary search may be performed after a position has been found to refine the precision of the position. A pre-determined number k of the strongest changes along the ray are stored and used to initialize the depth clusters for the path tracing. Consequently, the volume is divided into k+1 layers with the k positions defining boundaries between these layers. Scattering samples of the path tracer are routed to an appropriate one of the k+1 layers, according to whether a given sample is in front of or behind the k initial depth values or is between a given two of the k initial depth values. In an example, given a scattering location from the path tracer, a depth image or layer is selected for the given sample to be routed to. For example, the layer with the closest average scattering location may be selected or the layer with the highest average optical opacity, or the layer may be selected by another heuristic. Computation of the depth clusters from the ray casting is then updated, e.g., by updating the running average depth position for the given layer to which the sample is routed. Computation of the depth clusters may be updated when the view of the volume changes, or when the transfer function changes, or when the desired number k+1 of layers changes.

In one example, the depth image includes two layers. The two layers may form a boundary around a visible object represented in the volumetric dataset.

As described above, in order to determine a depth value for a surface using ray casting, an opacity threshold may be set for a ray, and the depth value may be taken as the depth where the opacity threshold is reached. In one example, two different opacity thresholds are set and used to determine a front layer and a back layer of the object.

In another example, a single opacity threshold is defined for the front and the back of the object and two rays are cast in opposite directions to determine the depth of the front layer and the back layer of the object for a given pixel. First a ray is cast with a predetermined opacity threshold to compute the depth of the front layer by determining when that opacity threshold is reached along the ray. Then, a second ray is cast in the opposite direction to the first ray, the second ray originating from a second intersection point of the first ray with the bounding box, on the opposite, farther, side of the volume. The point at which the accumulated opacity along the second ray reaches the threshold determines the depth of the back layer of the object. Accordingly, depth values for a given pixel are provided that give an indication of whether a given point along a viewing ray for that pixel is in front of, inside, or behind the object.

In one example, the accuracy of the depth values for the front and back layers of the objects may be improved by using the above described opposing rays to create bins around the boundary positions. During path tracing, depth values for the front and back layers may then be refined in the manner described above.

In examples described herein, the computed depth images are used to modify the rendering of the surface during embedding of the surface in the volume data. For example, different rendering styles may be set for surfaces depending on their position with respect to the depth image. For example, where a single set of depth values is used, one rendering style can be set for occluded surface fragments, and one style can be set for non-occluded surface fragments. Where two sets of depth values are used, surface fragments can be classified as in front of, within, or behind the volume data and different rendering styles can be used for these different classifications. The rendering styles may be a mesh rendering style where the surface is a mesh. For example, in the case of two sets of depth values: Phong shading may be used for surface fragments in front of an object in the volume data; Phong shading with reduced opacity may be used for surface fragments within an object in the volume data; and silhouette rendering may be used for surface fragments behind the object in the volume data.

Figure 3:
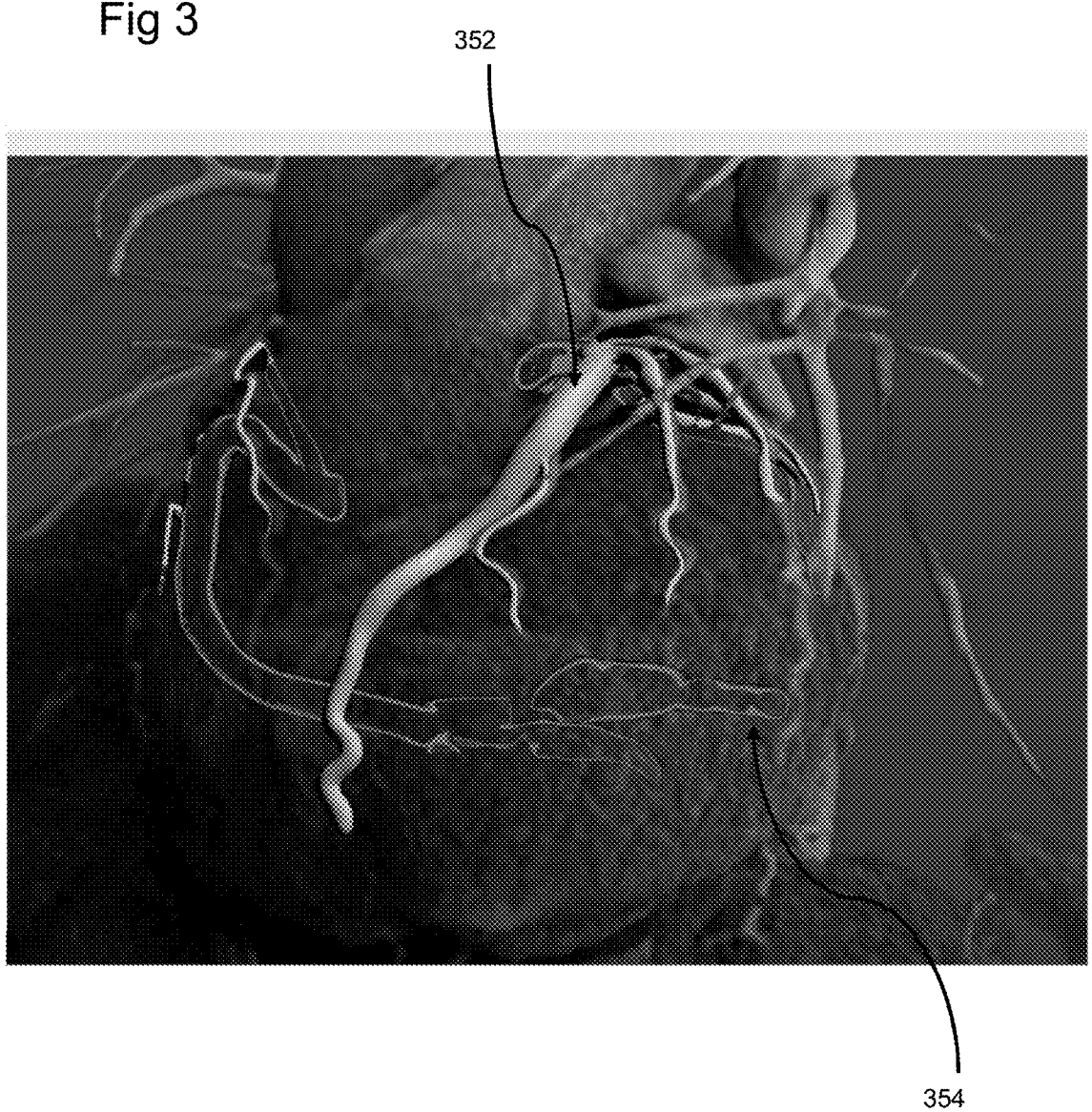
FIG. 3 shows an example combined rendering of a volumetric dataset and surfaces embedded therein, produced according to an example method described with reference to FIG. 1 described herein.

FIG. 3 shows an example produced according to an example method of the present disclosure where different rendering styles are applied to different fragments of the surface, depending on the position of the surface with respect to the layers in the depth image. FIG. 3 shows a volume rendering of a CT dataset representing a heart, with a first structure 352 and a second structure 354 embedded in the rendering. In this example, the first and second structures 352, 354 are segmented mesh surfaces representing blood vessels. The first structure 352 is in front of the depth layer, computed from the volume data, which corresponds with the closest surface of the heart. Therefore, the first structure 352 is not occluded by the volume. A first rendering style, in this example including Phong shading, is applied to the first structure 352, to convey to the viewer that the first structure 352 is in front of the heart. The second structure 354 lies behind the heart (behind the further layer of the depth image) and is thus occluded by the volume. Therefore, a different rendering style is applied to the second structure 354. In this example, the rendering style used for the second structure 354 is a silhouette style, specifically a lit silhouette. It will be appreciated that any suitable rendering style and/or effects may be applied to surfaces based on their position with respect to the layers in the depth image. In one example, a "toon" shading style may be applied to non-occluded surfaces while a dark silhouette may be applied to occluded surfaces. It will be appreciated that many other styles and effects are possible.

Figure 4:
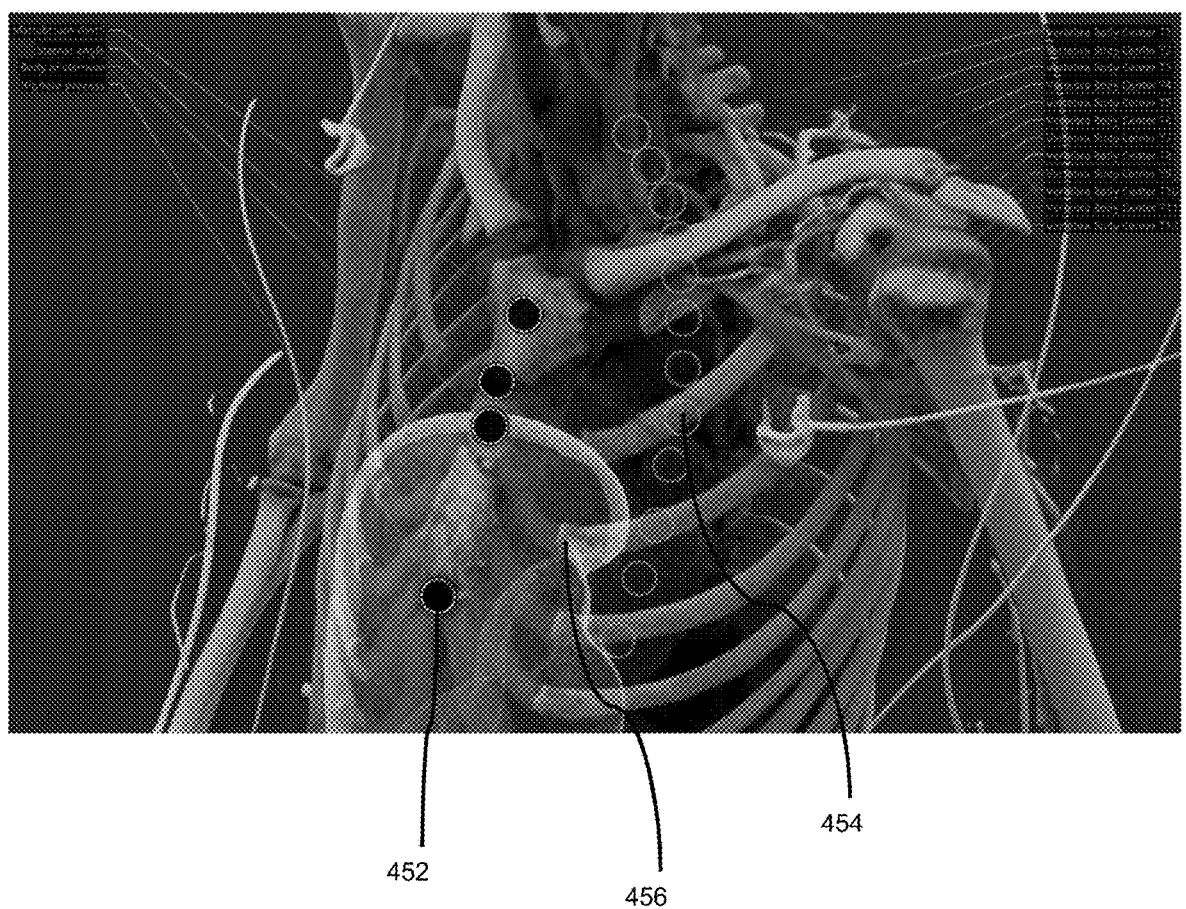
FIG. 4 shows another example combined rendering of a volumetric dataset and surfaces embedded therein, produced according to an example method described with reference to FIG. 1 herein.

FIG. 4 shows another example of a combined rendering of a volume and a surface embedded in the volume produced according to an example method of the present disclosure. In this example, a first set of landmarks 452 (sternum landmarks) are in front of the volume data (representing a patient), and a second set of landmarks 454 (spine landmarks) are behind the volume data. Different rendering styles are used for the first and second sets of landmarks 452, 454. A liver surface segmentation 456 is displayed within the volume data and is occluded by the volume data. In this example, since the liver surface segmentation 456 is occluded by the volume data, it is rendered using a silhouette rendering style.

In some examples, minimally occluding effects may be used to visualize an embedded surface and the effect may vary with time in order to show the full surface over a number of rendered frames. For example, single or multiple moving contours may be rendered along the surface. In another example, thresholds controlling a silhouette rendering effect may be varied with time, and in yet another example, an opacity for each band of a toon shading effect may be varied with time.

In one example, a mesh renderer may use heuristics to modify the silhouette edge during silhouette rendering to provide a consistent line thickness for various mesh sizes, resolutions and positions. For example, the area of each triangle of the mesh projected in screen-space can modify the silhouette threshold.

In another example, a separate depth image may be obtained in the manner described above when clip planes are applied to the volume rendering. This depth image allows modifying of the surface rendering style on each side of the clip plane.

In one example, silhouette edge rendering and toon shading are combined to produce a contrast-enhanced silhouette edge, where the three discrete toon-shaded bands closest to the silhouette edge are configured in the pattern dark-light-dark. This allows the colour of the middle band to be clearly distinguishable against both dark and light backgrounds.

In some examples, the depth image obtained during the volume rendering process may be used for other purposes than to modulate the surface rendering process. For example, the depth image may be used for point picking operations, which are consistent with the rendering of the surface embedded in the volume. That is, the depth image may be used for picking the 3D position on a surface which is covered by a given pixel. This can be done directly using the surface model, e.g., using a ray-triangle intersection test or using a spatial acceleration structure. In examples, the depth image may be used to determine the position of the anatomical structure in the volume which is covered by the pixel. Since the same depth image is used for embedding the surface as for defining the position of the anatomical structure in the volume, a consistent ordering of the anatomical structure of the volume and the surface results. Therefore, for example, if picking a point where the surface is displayed in front of the volume, picking will not select a volumetric 3D structure behind the surface.

Figure 5A:
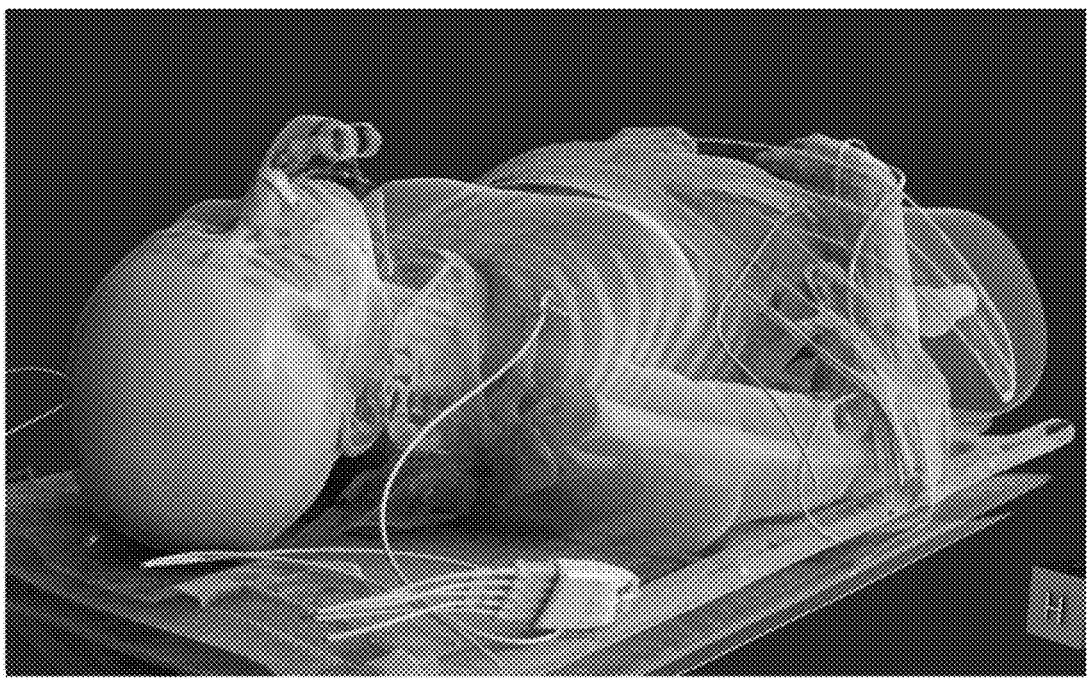
FIG. 5A shows an example of a rendering of a volumetric dataset produced according to a volume rendering technique.
Figure 5B:
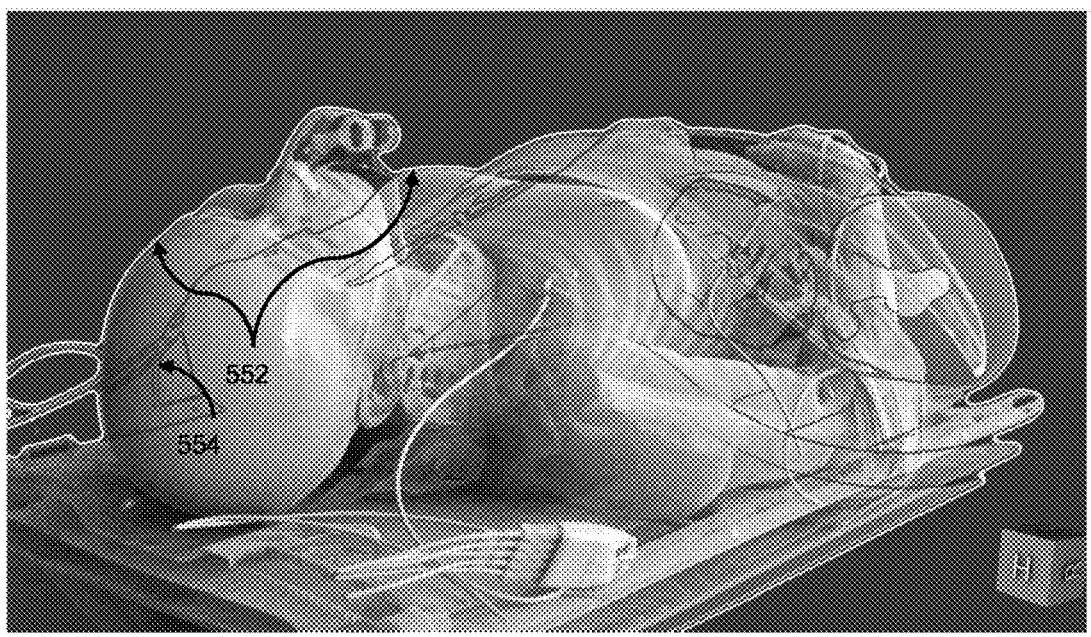
FIG. 5B shows a rendering of the volumetric dataset shown in FIG. 5A, produced according to an example method described with reference to FIG. 1.

In some examples according to the present disclosure, the depth image of the volume may be used to add additional features to the volume rendering, in order to present additional information to the viewer. For example, the depth image may be used to enhance the visualization of the volume, even where no added non-volumetric surfaces are present. For example, lines derived from the depth image corresponding with surfaces inherent in the volumetric dataset may be traced directly onto the image to visualize hidden structures in the volume. FIGS. 5A and 5B illustrate the application of such a method according to the present disclosure.

FIG. 5A shows a volume rendering of a volumetric dataset. FIG. 5B shows a volume rendering of the same volumetric dataset with surfaces inherent in the volumetric dataset rendered by tracing lines to render the surfaces and combining the rendering of the surfaces with the volume rendering of the volumetric dataset.

In FIG. 5B, the outline 552 is provided from the depth image by tracing the surfaces inherent in the volume that define the boundary between valid and invalid depth values in the depth image, where invalid depth values are pixels which have no depth value assigned to them, e.g., due to no surface in the volume being encountered by the viewing ray for that pixel. This may aid the viewer in seeing the outline of an object visualized by the volume rendering.

The depth image used for FIG. 5B includes front and back depth values for the object, and thus includes three depth layers. Further information can be presented to the viewer by using the depth image to enhance the volume rendering. For example, in FIG. 5B in addition to the outline 552 showing the boundary of the object as viewed from the viewing point, hidden edges 554 occluded by the object are traced on the image. The lines 554 representing hidden edges of the object are obtained from applying an edge-detection filter to the intermediate depth layer or to the final depth layer of the depth image. The lines 554 are overlaid on the rendering in order to visualize structural information on the side of the object opposite to the viewing point. The various lines may be traced in different colours to one another in order to convey information more effectively to the viewer.

Figure 6:
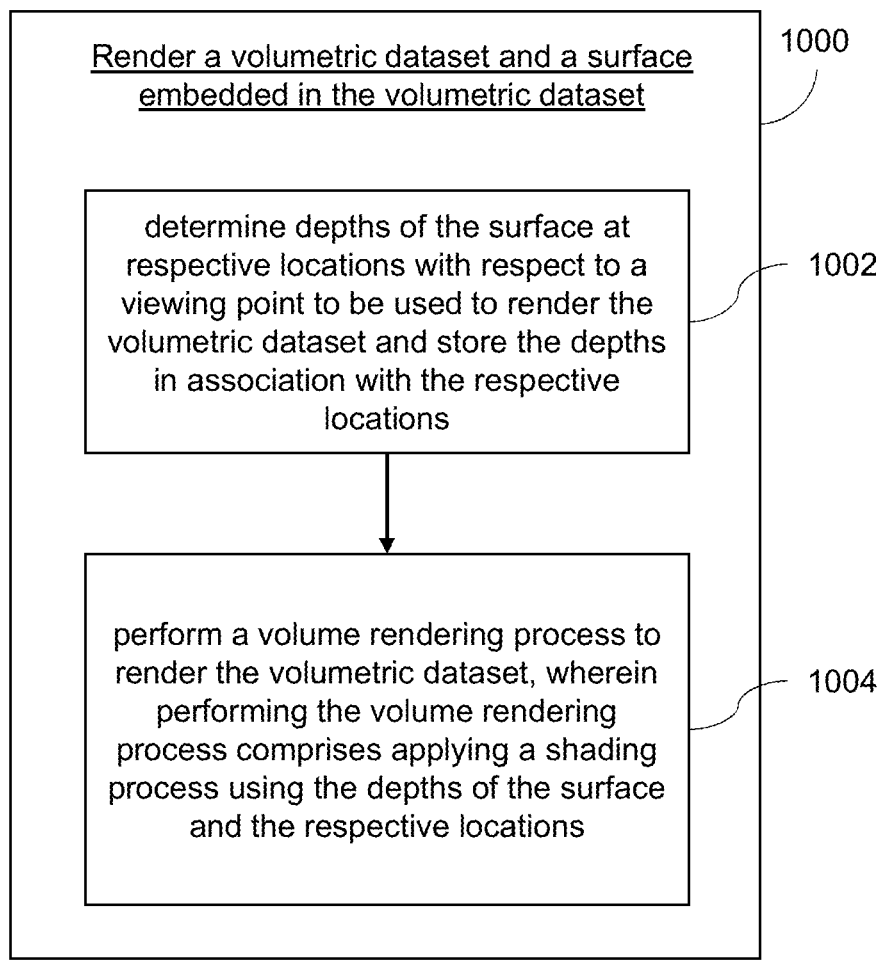
FIG. 6 illustrates a flow chart representation of a method of rendering a volumetric dataset and a surface embedded in the volumetric dataset according to certain examples described herein.

FIG. 6 illustrates a flow chart representation of another example computer-implemented method 1000 for rendering a volumetric dataset and a surface embedded in the volumetric dataset. The method 1000 may be performed to render a volumetric dataset and surface embedded therein having any of the features described above with reference to the volumetric dataset 200 and surface 250 shown in FIG. 2.

While methods described above use depths obtained during the volume rendering process to embed a surface, the method 1000 obtains depths of the surface, sometimes referred to herein as the geometry, and uses these depths during the volume rendering process. The method 1000 according to certain examples allows the surface to be embedded at an accurate position with respect to the volumetric dataset.

The method 1000 includes, at block 1002, determining depths of the surface 250 at respective locations with respect to a viewing point 10 to be used to render the volumetric dataset 200 and storing the depths in association with the respective locations. In a similar manner as described with reference to previous example methods, each of the respective locations may be associated with a pixel in the viewing plane 20. The depths and locations may include the per-pixel distance between the viewing camera and the surface embedded in the volume data. One or more depth values for the surface geometry may be obtained for each location. For example, with reference to FIG. 2, determining the depths of the surface 250 may include determining one or more depth values related to the surface 250 for each pixel in the image plane 20.

In some examples, the method 1000 includes performing a surface rendering process for producing a surface rendering of the surface 250. Determining of the depths of the surface 250 at the respective locations may be done as part of the surface rendering process. The surface rendering process may, for example, include a rasterization-based method during which depth data is computed. The surface rendering process may include any rendering process that involves the determination of depth values relating to the surface 250. Performing the surface rendering process may result in a plurality of surface fragments being produced. That is, each surface fragment may be associated with a given pixel in the viewing plane 20. A given pixel in the viewing plane 20 may have more than one surface fragment associated with it.

In one example, the surface rendering process includes a depth peeling process. In such examples, a fixed number of depth layers for the surfaces, or geometry, in the scene may be produced by rendering the surfaces in the scene a given number of times.

In another example, determining the depths and their respective locations may include generating a fragment linked list as part of the surface rendering process. In one such example, the surface rendering process includes producing a $k^+$-buffer, or for example, an A-buffer, or a K-buffer. Use of such a buffer, e.g., a $k^+$-buffer, may allow for efficient memory usage in determining and storing the depths. Use of such a buffer may also allow for single-pass rendering as opposed to an approach, such as depth peeling, which uses multiple passes.

In another example, determining the depths may include rasterizing the surface 250 for deferred shading during volume rendering. For example, a full set of G-buffers may be determined for each depth layer for later use. The information stored in the G-buffers, e.g., any one or more of depth information, colour information, and surface normal information relating to the surface, may be used in determining shading information when performing a volume rendering process to render the volume 200.

At block 1004, the method 1000 includes performing a volume rendering process to render the volumetric dataset 200. A shading process is applied during the volume rendering process and the depths of the surface 250 and the respective locations are used in the shading process. The volume rendering process may, for example, include ray casting or path tracing. The shading process may be applied as a step in the volume rendering process.

By using the depths obtained for the surface 250 during the volume rendering process, a combined rendering of the surface 250 and the volumetric dataset 200 can be obtained, as will now be described in more detail.

In some examples, performing the shading process includes defining one or more optical properties of a point (not shown) in the volumetric dataset 200. The one or more optical properties of the point in the volumetric dataset 200 may be defined based on a comparison of a depth of the point in the volumetric dataset 200 with a depth of a fragment of the surface 250 stored in association with a location associated with the point. The point may, for example, be placed at the location in the 3D volumetric dataset where the surface fragment is located. Alternatively, the point may be located in front of or behind the surface 250, with respect to the viewing point 10.

Where the volume rendering process includes ray casting, one or more rays 30 may be cast through the volume 200, in the manner described above with reference to FIG. 2. Each of these rays 30 is associated with a given pixel in the image plane 20. Further, any fragments of the surface 250 which lie along the ray 30 can be considered to be associated with points in the volumetric dataset which lie on the ray 30.

For example, when a ray 30 corresponding to a particular pixel in the viewing plane 20 is cast from the viewing point 10 through the volume 200, points along the ray 30 are sampled to be shaded and accumulated according to the volume rendering process. As has been described above, the voxels may be classified, e.g., by use of a transfer function, to assign optical properties to each voxel. These optical properties then define how the sample point interacts with light illuminating the volume 200. Shading at the sample point can then be computed to determine optical values to be accumulated along the ray 30. The process is repeated for a plurality of sample points along the ray 30 and the optical values accumulated to obtain values for display by the pixel associated with the ray 30.

From the process of determining depths of the surface 250, each pixel in the viewing plane 20 also has associated therewith a depth, or more than one depth, representing a depth of the surface 250 associated with that pixel, i.e., the depth of the surface fragment lying on the path of the ray 30. There may be more than one surface fragment lying on the path of the ray 30, and, thus, each pixel may have associated with it more than one depth for the surface 250. These surface depth or depths may be taken into account when performing the shading process at a sample point during volume rendering as will now be described.

By using the surface depth information in the shading of the point in the volume 200 during volume rendering, the surface 250 can be embedded in the volume rendering. That is, the volume rendering can take into account the position of the surface 250 with respect to the point in the volume 200 being shaded. As mentioned above, more than one depth may be determined for each pixel in the image 20. Accordingly, the shading process may take into account the location of the point being rendered with respect to more than one surface, for example located at different depths with respect to the volume.

Performing the shading process may include deriving one or more optical properties of the sample point in the volumetric dataset 200. The optical properties may, for example, include an optical opacity and colour. The optical properties may be derived from the acquired scalar data through classification. The optical properties are integrated along the ray during volume rendering. The optical properties may be determined by visual parameter data assigned to the sample point, for example, by way of classifying the scalar value of the sample point using a transfer function. Any of the parameters described above with reference to FIG. 2 may be assigned to the sample point. Further, as also described above with reference to FIG. 2, any suitable interpolation process may be used to obtain a scalar value associated with the sample point for use in the transfer function.

The modifying of the one or more optical properties of the sample point in the volumetric dataset 200 may be based on one or more properties of the fragment or fragments of the surface 250 associated with the sample point. For example, a fragment of the surface associated with the sample point may have a colour and an opacity associated therewith. The surface 250 may also include one or more shading properties which may be used during computation of shading. Some shading properties, such as local curvature and gradient magnitude, may be derived from the scalar data of the volumetric dataset 200. Other shading properties, such as a roughness of the surface, may be not derived from the scalar data.

Shading the sample point in the volume 200 during volume rendering may include performing a blending process to blend a colour of the sample point with a colour of the fragment of the surface 250 which is associated with the sample point. Such values may also be used during the shading process. Accordingly, modified optical properties for the sample point may take into account the position of the sample point with respect to a surface fragment associated with the sample point and the modified optical properties may be based at least in part on properties of the surface fragment or fragments associated with the sample point.

According to one example, the ray casting process may compute the integral of the optical opacity along a viewing ray (through a given pixel) by evaluating the optical properties of the volume at sample points along the viewing ray. In one example, the sample points can be equally spaced. The sample points may be sorted front to back and alpha blending may be used to accumulate the colour and opacity along the ray. Using the depth information of the surfaces, e.g., obtained from depth-peeling or other processes described above, sample points along the viewing ray located at the depths of the surfaces along the viewing ray are sorted together with the sample points and are included in the alpha blending process.

In some examples, the shading of points during the volume rendering process may be configured to provide different rendering effects. For example, the volume rendering of an object having a surface located behind it may be tinted with the colour of the surface. For example, the object in the volume may be a bone and the surface may be located behind the bone and represent a landmark. The bone may be tinted with the colour of the landmark in one example effect. In other examples, a silhouette effect showing the edge of a surface may be obtained by modifying points associated with the edge of the surface in a different manner to points which are not associated with the edge of a surface. For example, the bone in the previous example may be tinted to show a silhouette of the landmark lying behind the bone. In another example, a cut-out effect may be implemented by reducing the opacity of points in the volume. For example, a transparent cut-out at the location of the surface fragment may be produced by reducing the opacity of the points in the volume located at the same point as the surface fragment.

Examples described above according to FIG. 6 using volume ray casting may also be employed where a path tracing method is used to render the volume. In such examples, the surface depth information may be only valid for the primary viewing rays i.e., and not for scattered, reflected or refracted rays. In any case, an embedding of the surface in the volume rendering may be obtained through modifying the optical properties of the voxels along the primary rays used during the path tracing.

Accordingly, methods according to FIG. 6 provide for accurate embedding of surface data in the volumetric dataset and may allow surfaces embedded in the volumetric dataset to be visualised by modifying the optical properties of points in the volumetric dataset during volume rendering in order to represent the embedded surface. When the surface data is updated, for example, where a landmark or other object is moved with respect to the volume, the volume rendered typically will become invalid. That is, since the surface depth information is embedded in the shading of the volume, e.g., in a modified classification of the voxels of the volume, modifying the surface may require restarting the volume rendering process.

In certain examples, the depths of the surface may be used to stop traversal of the ray when the ray reaches the surface. This may be useful when the surface is opaque, for example. By modifying the shading of voxels during the volume rendering process, various effects can be implemented to embed the surface in the volume. For example, the surface may be visualised in a minimally occluding manner, e.g., allowing transparency effects to be implemented, while embedding the surface at an accurately determined depth with respect to the volume. The approach described with reference to FIG. 6 may be particularly useful for rendering landmarks, such as labels of parts of an anatomy, where accurately embedding the landmark at a particular depth with respect to the volume may be desirable. However, methods described with reference to FIG. 6 may be used to render any type of embedded surface and may achieve accurate placement of the visualization of the surface with respect to the volume.

Figure 7:
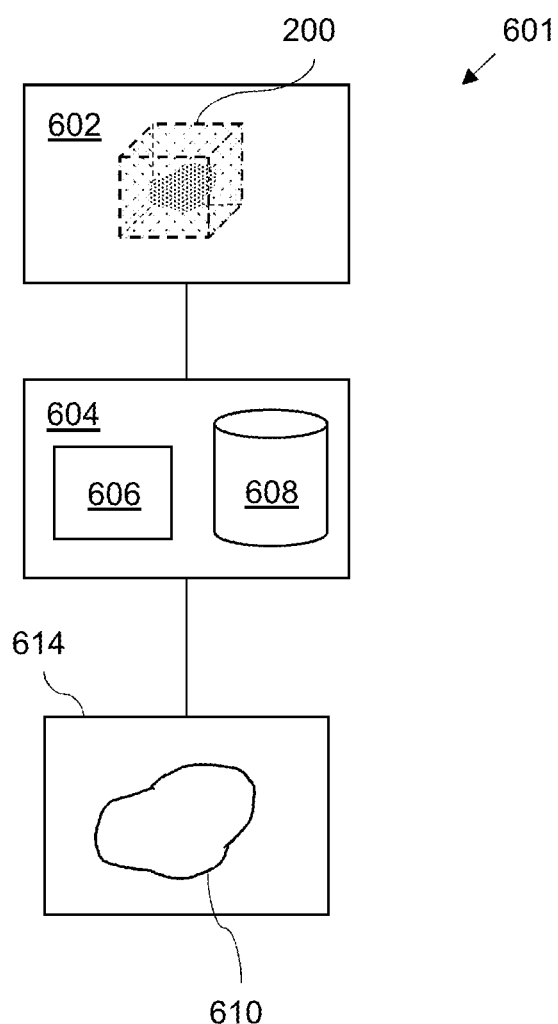
FIG. 7 illustrates schematically a system including a rendering apparatus, for performing example methods described herein.

Referring now to FIG. 7, there is illustrated schematically an example system 601 in which an example rendering apparatus 604 may be used. The system 601 includes a scanner 602, the rendering computer or apparatus 604, and a display or visualization unit 614. In examples, the system may include fewer components than or additional components to those illustrated in FIG. 7. For example, the system 601 may include a computer network such as the internet.

The scanner 602 may be any scanner for generating a dataset including the volumetric dataset 200, which, as described may, for example, be a medical volumetric dataset representing a portion of a patient. For example, the scanner 602 may be a computed tomography (CT) scanner, a magnetic resonance imaging (MRI) scanner, a positron emission tomography (PET) scanner, an ultrasound scanner or the like. In another example the scanner 602 may, for example, be for producing a volumetric dataset representing geological data. The scanner 602 is connected to the rendering apparatus 604, for example via wired or wireless connection. The scanner 602 may be arranged to provide the volumetric dataset to the rendering apparatus 604.

The rendering apparatus 604 includes a processor 606 (e.g., image processor or graphics processing unit (GPU)) and a memory, in the form of a storage 608. The rendering apparatus 604 may, for example include a GPU. In this example, the rendering apparatus 604 may be arranged to perform the above described methods of volume rendering the volumetric dataset 200 and obtaining depth values from the volumetric dataset 200 and may also be arranged to perform the above described methods of rendering a combination of the volumetric dataset 200 and a surface 250 embedded in the volumetric dataset 200. The rendering apparatus 604 may also be arranged to perform methods described above with reference to FIG. 6 wherein depth information related to the surface is obtained and is used during a volume rendering process.

For example, the storage 608 may include a non-transitory machine-readable medium including a set of machine-readable instructions which when executed by the processor 606 cause the rendering apparatus 604 to perform one of the example methods described herein. The program may be stored on a computer readable medium which may be read by the rendering apparatus 604 to thereby execute the program. The rendering apparatus 604 may be arranged to receive directly or indirectly or otherwise acquire from the scanner 602 the volumetric dataset 200. The rendering apparatus 604 may further be arranged to generate or otherwise obtain the surface 250.

The rendering apparatus 604 may include a processor for operating any volume rendering method capable of simulating light transport within the volumetric dataset 200. Examples of suitable rendering methods are ray casting and path tracing. In certain examples, the rendering apparatus 604 is also arranged to operate a suitable surface rendering method, such as a rasterization method, a ray-tracing method or a path-tracing method, to render the surface 250. In certain examples the rendering apparatus 604 may also be configured to perform a method of compositing the result of a volume rendering process with a result of a surface rendering process. For example, in such examples, the rendering apparatus 604 may be arranged to combine the volume rendering with the surface rendering by a suitable technique, for example, by depth embedding or by overlaying the surface rendering on the volume rendering using a suitable compositing technique, such as alpha compositing.

The rendering apparatus 604 may be arranged to transmit information, for example, a colour value for each pixel in an image plane, to a visualization unit 614. The transmission may be direct or indirect, for example via a wired connection, a wireless connection, or via the internet.

The visualization unit 614 may include visualization software for displaying a two-dimensional projection of the volume 200 and surface 250 produced by the rendering apparatus 604. The visualization unit 614 may include a display screen, and one or more graphics hardware or software components. In some examples, the visualization unit 614 may be or include a mobile device. In some examples the visualization unit 614 may include a virtual-reality device.

In a given situation where it is desired to render a volumetric dataset and a surface embedded in the volumetric dataset, one of the methods described herein may be selected. Each method has different advantages and these advantages may be taken into account when deciding which method to use for a given rendering task. For example, the method described with reference to FIG. 1, wherein depths obtained from a volume rendering process are used in a surface rendering process, provides the advantage, among others, that the surface can be changed without requiring restarting of the volume rendering process while also allowing for different rendering effects, such as non-obtrusive rendering effects, to be applied. This may make it particularly suitable, for example, for live editing of landmarks and/or annotations embedded in the volume. The method described with reference to FIG. 6, provides the advantage, among others, of accurate embedding of the surface at a position with respect to the volumetric dataset while, similarly, also allowing for different rendering effects, such as non-obtrusive rendering effects, to be applied.

In some examples, the volume rendering and the surface rendering produced according to methods described herein may be considered to be fully decoupled from another, i.e., lighting effects or the like used to render to the volume are not visible in the surface rendering, and vice versa. However, in other examples, some shading effects may be shared between the volume rendering and the surface rendering. For example, shadows and ambient occlusion effects may be shared. In some examples, deferred shading may be used for the surface rendering.

Example methods described herein may be used in non-medical imaging environments. Any applications using 3D rendering of hybrid volume and surface data, such as computational fluid dynamics, computer assisted design, or manufacturing, may benefit from the ability to handle complex and accurate interactions between a surface and volume in physically-based rendering.

The above embodiments are to be understood as illustrative examples of the invention. Other embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A computer-implemented method for rendering a volumetric dataset and a surface embedded in the volumetric dataset, the method comprising:
   performing a volume rendering process, the volume rendering process generating a volume rendering of the volumetric dataset;
   determining, based on the volume rendering process, depths of respective locations in the volume rendering and storing the depths in association with the respective locations, wherein for at least some of the respective locations, a plurality of depths per location are determined;

performing a surface rendering process, the surface rendering process generating a surface rendering of the surface using a plurality of surface rendering styles, the surface rendering process comprising using the depths and respective locations, wherein the surface rendering process comprises, based on a comparison of a depth of a fragment of the surface with a depth or a plurality of depths stored in association with a location associated with the fragment of the surface, selecting a surface rendering style of the plurality surface rendering styles for use in rendering the fragment by the surface rendering process; and combining the volume rendering and the surface rendering into a combined rendering of the volumetric dataset and the surface.

2. The method according to any of claim 1 wherein the volume rendering process comprises a physically-based rendering process and the depths are obtained by sampling paths traced during the physically-based rendering process.

3. The method according to claim 2, wherein the depths are obtained by determining, for each pixel in the volume rendering, an average depth value from a plurality of paths sampled to render the pixel by the physically-based rendering process.

4. The method according to claim 1 wherein determining the depths of the respective locations in the volume rendering comprises using a ray casting process to obtain the depths.

5. The method according to claim 4:
wherein using the ray casting process to obtain the depths comprises:
casting a plurality of rays through the volumetric dataset, each ray being associated with a location of the respective locations;
determining, along each of the rays, at least one depth value associated with a predetermined change in a value related to the volumetric dataset, and storing the at least one depth values in a data structure; and
selecting, according to predetermined criteria, a predetermined number of the at least one depth values at each respective location to be used as initial values for the depths at each of the respective locations.

6. The method according to claim 5:
wherein determining the depths of each respective location comprises modifying the initial values using data obtained from a physically-based rendering process.

7. The method according to any of claim 1 wherein selecting the rendering style comprises selecting between a silhouette rendering style and a style including Phong shading.

8. A computer-implemented method for rendering a volumetric dataset and a surface embedded in the volumetric dataset, the method comprising:
performing a volume rendering process, the volume rendering process generating a volume rendering of the volumetric dataset;
determining, based on the volume rendering process, depths of respective locations in the volume rendering and storing the depths in association with the respective locations;
performing a surface rendering process, the surface rendering process generating a surface rendering of the surface, the surface rendering process comprising using the depths and respective locations; and combining the volume rendering and the surface rendering into a combined rendering of the volumetric dataset and the surface;
wherein determining the depths comprises determining, for at least some of the respective locations in the volume rendering, a plurality of depths per location and storing each of the plurality of depths in association with a location of the locations.

9. The method according to claim 8 wherein the surface rendering process comprises, based on a comparison of a depth of a fragment of the surface with a depth stored in association with a location associated with the fragment of the surface, clipping the fragment of the surface from the surface rendering.

10. The method according to claim 8 further comprising selecting, for a given fragment of the surface, a surface rendering style or parameter for use in the surface rendering process used to render the fragment based on whether a comparison of a depth associated with the fragment with a depth of the depths at a location associated with the fragment indicates that the fragment is in front of, inside or behind an object in the volumetric dataset.

11. A computer-implemented method for rendering a volumetric dataset and a surface embedded in the volumetric dataset, the method comprising:
performing a volume rendering process, the volume rendering process generating a volume rendering of the volumetric dataset;
determining, based on the volume rendering process, depths of respective locations in the volume rendering and storing the depths in association with the respective locations;
performing a surface rendering process, the surface rendering process generating a surface rendering of the surface, the surface rendering process comprising using the depths and respective locations; and
combining the volume rendering and the surface rendering into a combined rendering of the volumetric dataset and the surface;
further comprising selecting, for a given fragment of the surface, a surface rendering style or parameter for use in the surface rendering process used to render the fragment based on a comparison of a depth of the fragment with a depth of the depths at a location in the volume rendering associated with the fragment.

12. The method according to claim 11, wherein selecting comprises selecting, for the fragment, the surface rendering style or parameter for use in the surface rendering process used to render the fragment based on whether the comparison of the depth of the fragment with the depth at the location in the volume rendering associated with the fragment indicates that the fragment is occluded by or is not occluded by an object in the volumetric dataset.

13. A computer-implemented method for rendering a volumetric dataset and a surface embedded in the volumetric dataset, the method comprising:
determining depths of the surface at respective locations with respect to a viewing point to be used to render the volumetric dataset and storing the depths in association with the respective locations, the surface being an added surface separate from the volumetric dataset, wherein for at least some of the respective locations, a plurality of depths per location are determined and storing each of the plurality of depths in association with a location of the locations; and
performing a volume rendering process to render the volumetric dataset, the volume rendering process comprising applying a shading process using the depths of the surface and the respective locations.

14. The computer-implemented method according to claim 13, wherein the volume rendering process comprises a modification process to modify one or more optical properties of a first point in the volumetric dataset based on a comparison of a depth of the first point with a depth of the surface stored in association with a location associated with the first point.

15. The computer-implemented method according to claim 14, wherein the modification process is based on one or more properties of a fragment of the surface having the depth stored in association with the location associated with the first point.

16. The computer-implemented method according to claim 15, wherein the one or more properties of the fragment of the surface comprise a colour, an opacity, and/or a normal direction.

17. The computer-implemented method according to claim 16, wherein modifying the one or more optical properties of the first point comprises performing a blending process to obtain a modified colour for the first point based on a colour of the first point and a colour of the fragment of the surface.

18. The computer-implemented method according to claim 17, wherein modifying the one or more optical properties of the first point comprises determining one or more parameters of the blending process based on a property of the fragment of the surface, the property indicating that the fragment of the surface is at an edge of the surface.

19. The computer-implemented method according to claim 16, wherein the one or more optical properties of the first point comprise an opacity, and wherein modifying the one or more optical properties of the first point comprises modifying the opacity of the first point.

20. The computer-implemented method according to claim 13, wherein the method comprises performing a surface rendering process to produce a surface rendering of the surface, and wherein the surface rendering process comprises the determining of the depths of the surface.

21. The computer-implemented method according to claim 20, wherein the surface rendering process comprises a rasterization-based process.

22. The computer-implemented method according to claim 21, wherein the determining the depths of the surface at the respective locations comprises performing a depth peeling process.

23. The computer-implemented method according to claim 21, wherein the determining the depths of the surface at the respective locations comprises generating a fragment linked list.

24. The computer-implemented method according to claim 21, wherein the surface rendering process comprises rasterizing the surface for deferred shading during the volume rendering process.

25. The computer-implemented method according to claim 13, wherein the volume rendering process comprises a ray casting process or a path tracing process.

26. The computer-implemented method according to claim 25, wherein the shading process comprises computing shading for points along each of one or more rays cast during the ray casting process or along each of one or more primary rays used during the path tracing process.

27. An apparatus comprising:
a processor; and
a non-transitory memory storing therein a set of machine-readable instructions which when executed by the processor cause the processor to:
generate a volume rendering of a volumetric dataset;
determine, based on the volume rendering, depths of respective locations in the volume rendering, wherein for at least some of the respective locations, a plurality of depths per location are determined;
generate a surface rendering of a surface using the depths and respective locations using a plurality of rendering styles wherein a rendering style is selected from the plurality of rendering styles to form the surface rendering based on a comparison of a depth of a fragment of the surface with a depth of the depths or the plurality of depths for the respective location associated with the fragment of the surface; and
combine the volume rendering and the surface rendering into a combined rendering of the volumetric dataset and the surface.

* * * * *